United States Patent Office 3,326,062
Patented June 20, 1967

3,326,062
DEVICE FOR TRANSMITTING POWER AT VARIABLE SPEED
Modesto Pratolongo, Milan, Italy, assignor to Numa Nuove Macchine S.r.l., Milan, Italy
Filed Dec. 8, 1964, Ser. No. 416,738
Claims priority, application Italy, Apr. 9, 1964, Patent 719,275; July 21, 1964, 15,952/64
8 Claims. (Cl. 74—688)

It is an object of the present invention to provide a device for transmitting power at variable speed and more particularly a mechanical power transmitter substantially constant at greatly variable speeds, especially suitable for automotive vehicles.

Said transmitter transmits the available power from an input shaft to an output shaft through two distinct ways acting individually or contemporaneously, one direct with a ratio of 1:1 and the other indirect with reduced ratio, the two movements of rotation taking place one around the main axis (of the input shaft) and the other around an axis passing through a point of said main axis, to produce a series of combinations of movements the resultant of which is transmitted to the output shaft with variable speed according to the variation of the traction force required for the vehicle.

The variation of the ratio of transmission (speed) is continuous and progressive and theoretically follows the known hyperbolic curve of the traction force. Indicating by P the constant power acting upon the input shaft and by T and V respectively the variable resistant effort and the speed of the output shaft, the variation of the factors T. V, takes place automatically according to the driving conditions of the vehicle without need of any external operation. Such transmission device has moreover the capacity of automatically changing operating conditions from "direct drive" to "idling."

The variable speed power transmitting device according to the invention comprises a drive wheel, an element mounted rotatably around the axis of the drive wheel and carrying a driven wheel meshing with said drive wheel and having its axis inclined with respect to the axis of the drive wheel and its center on the axis of said drive wheel, a shaft moved coaxial with said drive wheel, and connected with said moved wheel by means of a coupling, said element and said drive shaft being connected with each other by a coupling capable of slipping depending on the torsional stress between said moved shaft and said drive shaft.

For a more detailed explanation of the invention, reference is made hereinafter, merely by way of example and without limitation, to the accompanying drawings wherein:

FIGURES 1 and 2 diagrammatically represent in elevation and in plan view, a system of transmission of movement between two wheels in internal engagement, rotatable about parallel axes;

Figure 4:
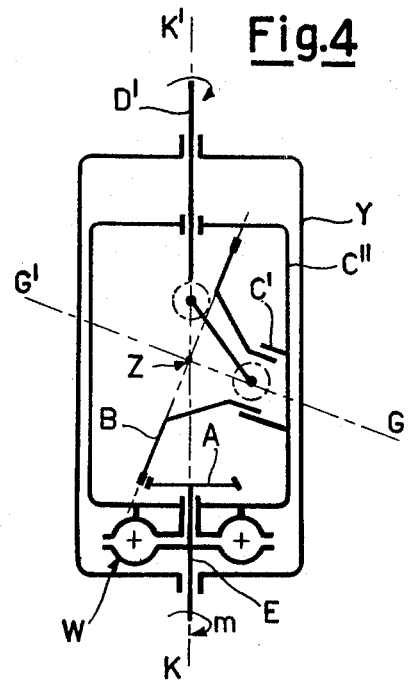
FIGURE 4 is a diagrammatic illustration similar to that of FIG. 3 but in which are diagrammatically shown the means for collecting power directly from the inclined wheel by means of a first coupling and from the drive shaft by means of a coupling capable of slipping depending on the torsional stress transmitted to the utilization.
Figure 5:
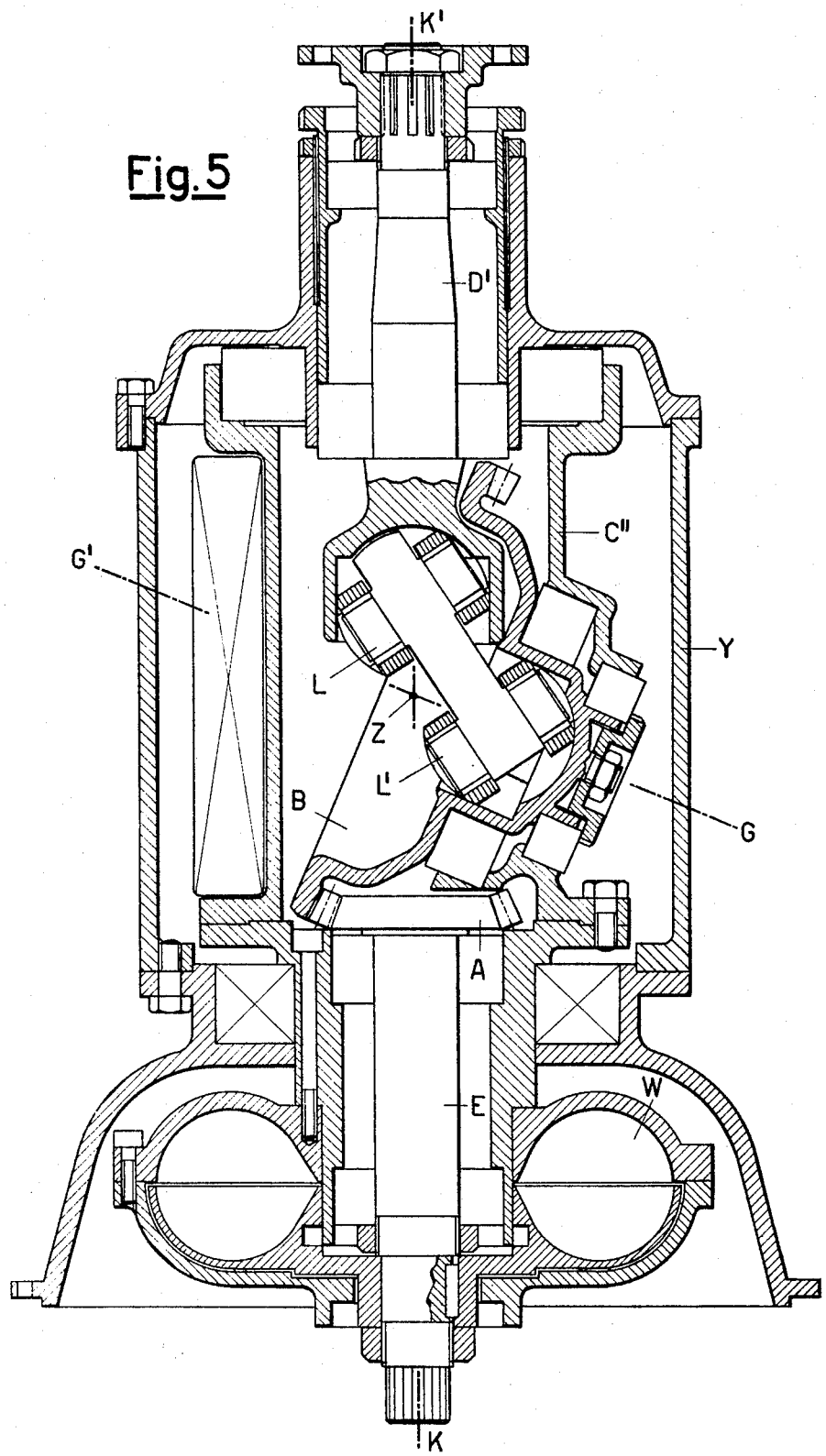
Figure 6:
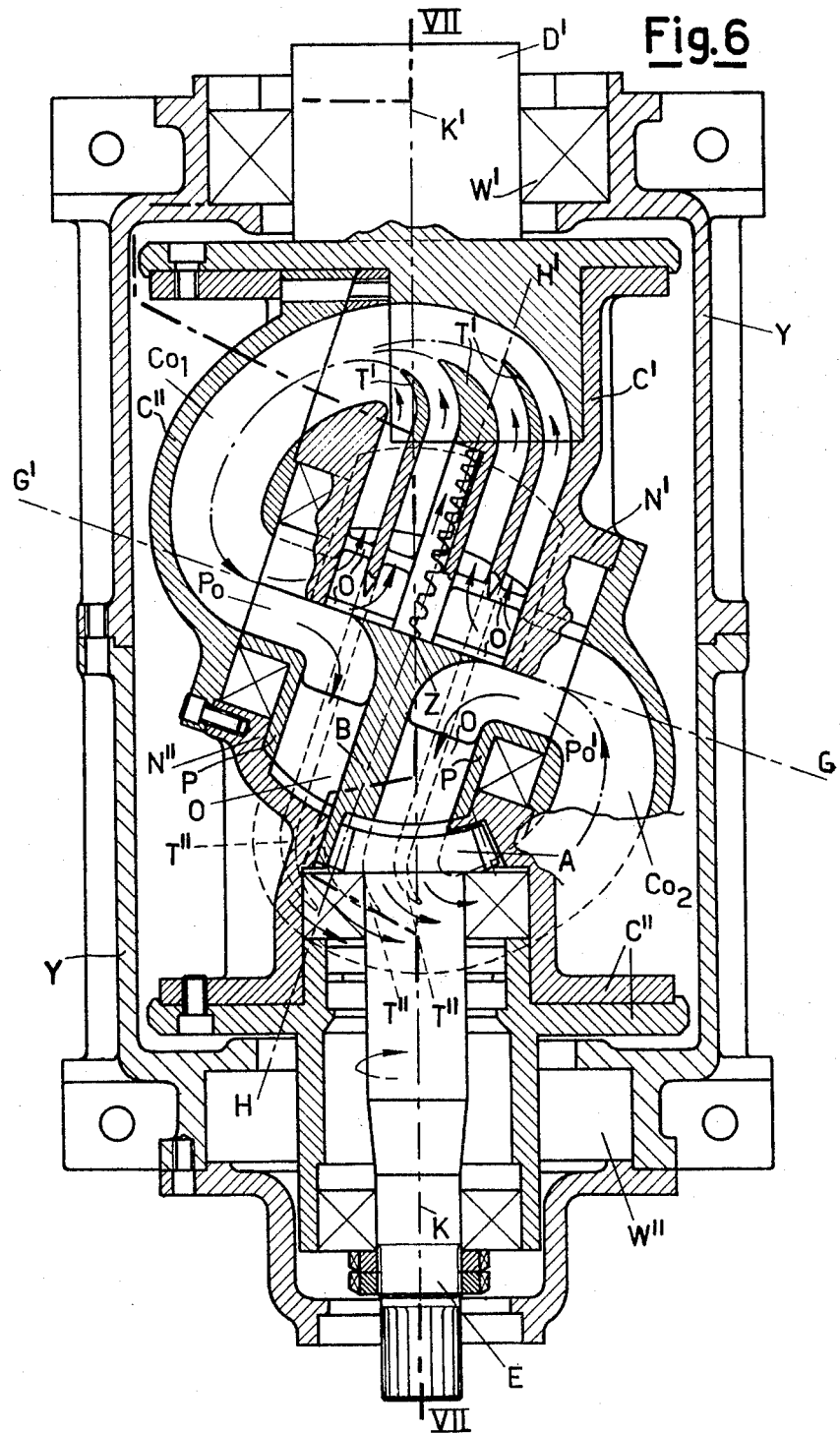
Figure 7:
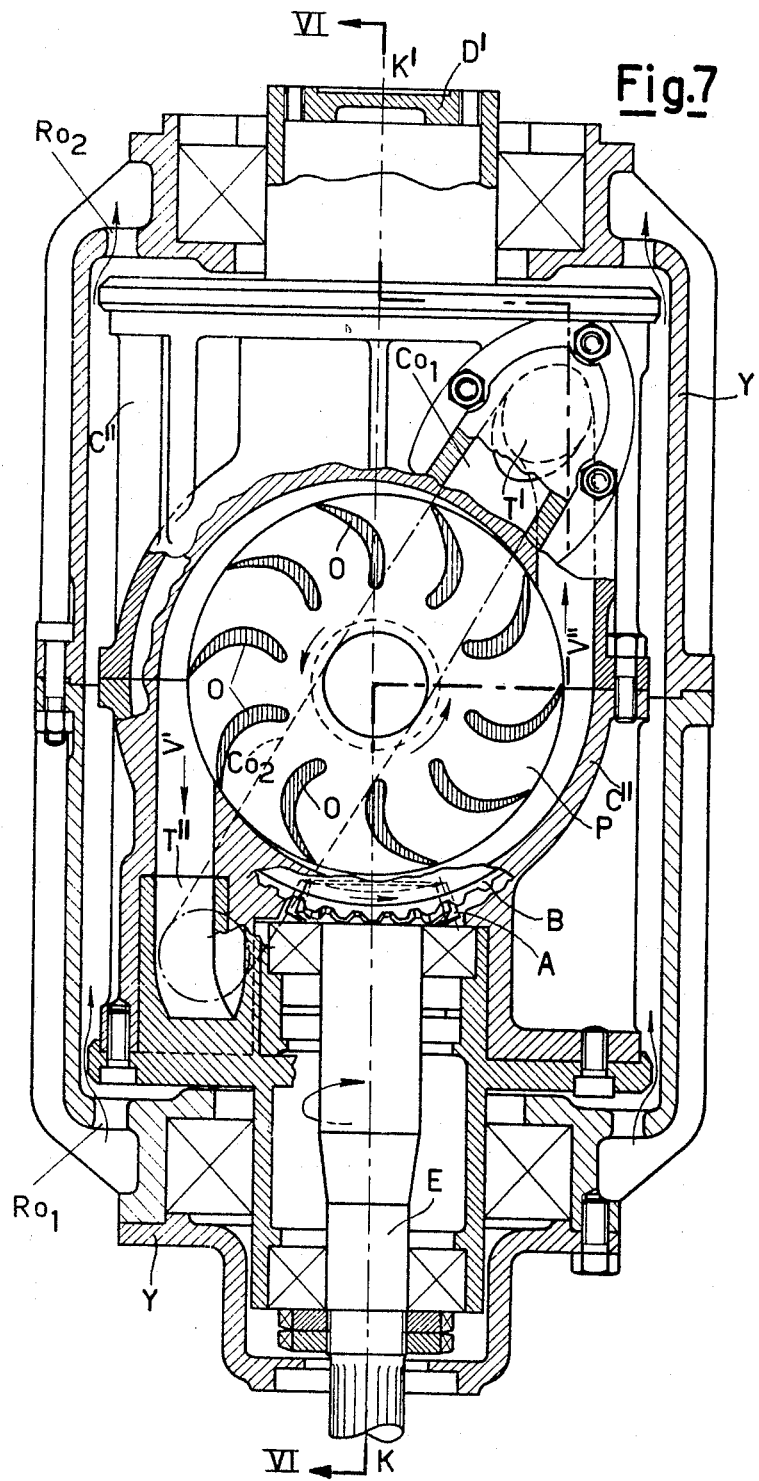
Figure 8:
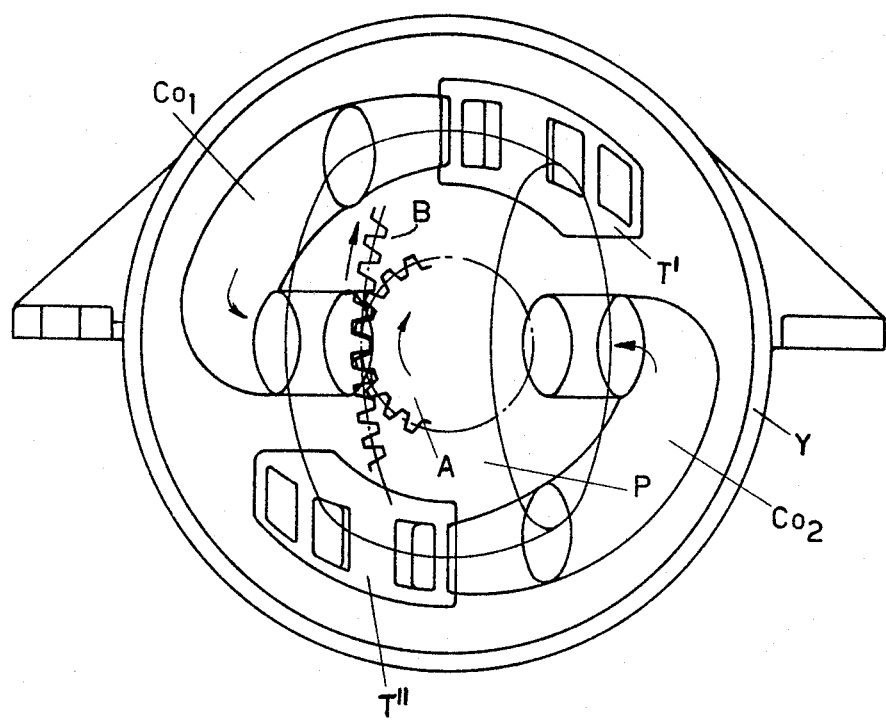

FIGURE 5 in axial section of an embodiment of a device corresponding to the diagrammatic illustration in FIG. 4;

FIGURE 6 is a longitudinal section taken along the line VI—VI of FIG. 7, of a different embodiment of the device according to the invention;

FIGURE 7 is a section taken along the line VII—VII of the device of FIGURE 6;

FIGURE 8 is a diagrammatical cross-section through the device of FIGURES 6 and 7.

Figure 1:
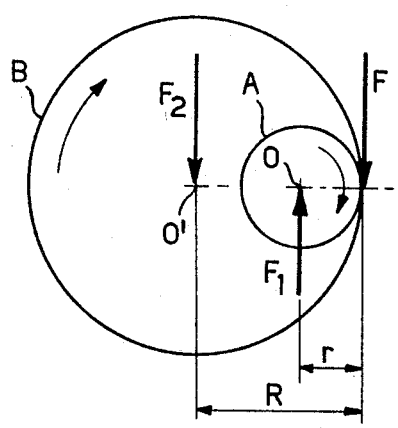
Figure 2:
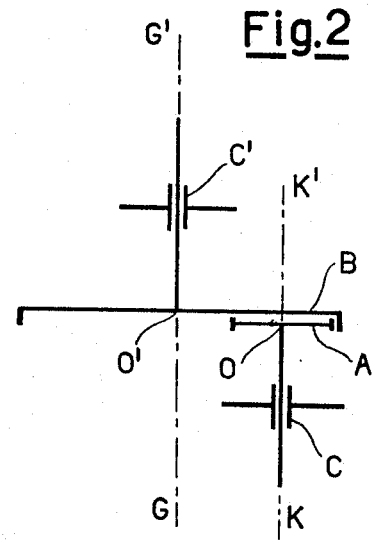

In FIGURES 1 and 2, the reference characters are defined as follows:

$A$ = the drive wheel,
$B$ = the driven wheel,
$O$ = the center of the drive wheel A,
$O_1$ = the center of the driven wheel B,
$r$ = the radius of the drive wheel A,
$R$ = the radius of the driven wheel B,
$\frac{R}{r} = K =$ the ratio of reduction,
$K-K'$ = the axis or shaft of the drive wheel A,
$G-G'$ = the axis or shaft of the driven wheel B,
$C$ = the support of the wheel A,
$C'$ = the support of the wheel B.

Let us assume that the supports C and C' of the two axes K–K' and G–G', on which the wheels A and B can turn, are fixed. The moment M applied by the engine to the wheel A (drive wheel) is transmitted to the wheel B by means of a force F acting at the point of contact between the two wheels, along the direction and the senses of rotation as indicated.

The application of the force F generates the following forces of reaction, according to the indicated senses of direction:

$F_1$ in the constraint of the axis K–K',
$F_2$ in the constraint of the axis G–G'.

The moment M transmissible to the shaft G–G' rigid with the wheel B, will be:

$$F \cdot R = M$$

by $$K = \left(\frac{R}{r}\right)$$

times higher than the drive moment M applied to the wheel A.

Also the following should be noted:

(1) the direction of rotation of the two wheels A and B is the same;
(2) the speed of rotation of the wheel B will be by $$K = \left(\frac{R}{r}\right)$$

times higher than the speed of rotation of A.

The illustrated diagram may be considered to represent a reducer with a fixed ratio, non-coaxial axes, able to multiply the drive torque by $$K = \left(\frac{R}{r}\right)$$

Figure 3:
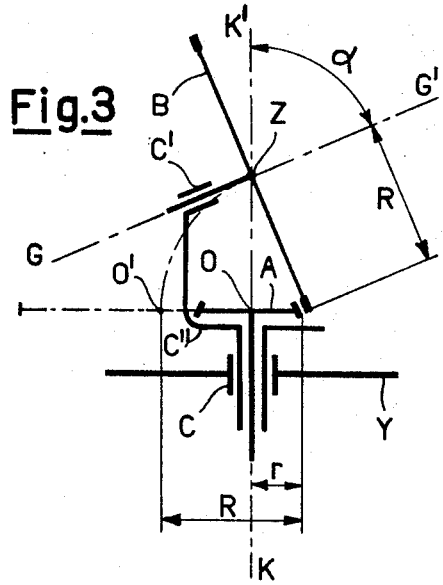
FIGURE 3 is a diagrammatic representation of a system of transmission of the movement from one wheel to another wheel in engagement therewith and inclined in such a way that the geometrical center of said other wheel lies on the axis of rotation of the first wheel.

In FIG. 3 there is represented the two gears A and B in engagement with each other but arranged somewhat differently as compared with the preceding figures.

In this regard notation is made of the following:

(a) The support C of the axis K–K' passing through the center O of the drive wheel A has remained constrained to the fixed body Y.

(b) The center O' of the driven wheel B has undergone (with respect to FIGURES 1 and 2) angular displacement along the arc of circle of radius R, in the plane normal to the circumference of A, until axis G–G' is coincident with axis K–K' at the point Z.

(c) The axis G–G' of rotation of the driven wheel B that was initially parallel to the axis K–K', now forms therewith the angle alpha.

(d) The support C' of the shaft rigid with the wheel B turning around the axis G–G' is no longer directly constrained to the fixed body Y, but is constrained to another support C".

(e) The support C" is constrained to the fixed body Y but is free to rotate around the axis K–K".

(f) The lever arm O–O' equal to $(R-r)$ in FIGURES 1 and 2, has been annulled with respect to the axis of rotation K–K' (a fundamental characteristic of the instant invention), since the center O' (point of application of the force $F_2$ in FIGURE 1) now coincides with said axis K–K'.

(g) The force of reaction $F_2$, which in FIG. 1 was a single force, at the center O', now acts as a larger component at the point Z, in a direction normal to the plane of FIG. 3, and as a smaller component upon the support C", outside the axis K–K', normal to the plane of the FIGURE 3.

(h) Said force of reaction $F_2$ in FIG. 3 produces a moment $F_2 \cdot R \cos(90°\text{-alpha})$ where $R \cos(90°\text{-alpha})$ is the distance between the point Z at which the center O' of the wheel B is disposed, and the center O of the wheel A, which moment will not cause any rotation around the axis K–K' and not even around any other axis normal thereto, since it will be absorbed by the supports C' and C" and by the fixed body Y; a further moment $F_2 R \sin(90°\text{-alpha})$ which will tend to cause a rotation of the support C" in a direction opposite the direction of rotation of the drive shaft, namely in a negative sense.

In particular if the shaft that takes the power from a point of the axis G–G', is coaxial to the drive shaft and is connected to said point by means of any coupling or systems of couplings, one can obtain a coaxial reducer capable of increasing the torque provided by the engine, under the condition of balancing the negative moment $F_2 \cdot R \sin(90°\text{-alpha})$ by an equal positive moment obtainable by utilizing a portion of the motive power.

It should be noted that the reducer diagrammatically illustrated is called with reason coaxial since not only the input and output shafts lie on one single axis, but also the center of all of the wheels partaking in the reduction lie on the same axis in common with the shafts.

Still observing FIG. 3 it appears that if to the support C" there is applied a portion of the motive power higher than that needed for balancing the negative moment, while the power is always transmitted by the wheel A to the output shaft of the reducer, a variation is obtained of the ratio of speed between the wheels B and A.

If in the input shaft there is utilized a device with a hydraulic or a friction clutch of other type, for instance electrical or mechanical, cooperating with said support C" in such a way as to tend to render the input shaft and the support C" rigid with each other, the speed of the output shaft tends to assume the same value as the speed of the input shaft.

Such an arrangement has been diagrammatically represented in FIGURE 4 wherein, with the wheel A turning at a certain speed, the wheel B transmits to the outlet shaft D' a much lower speed and a much greater torque than that taken from the drive shaft E. Together with the drive shaft there also turns the lower part of a hydraulic clutch W which is secured to the drive shaft; when a liquid such as oil is injected into said hydraulic clutch, the rotary part of said clutch tends to drag along in positive rotation the support C" the movement of which becomes added to that of the wheel B thereby increasing the speed of rotation of the driven shaft and diminishing the speed of the wheel B relative to the wheel A. When the hydraulic clutch W transmits the entire rotation to the part of the clutch rigid to the support C", the wheel B stands still relative to wheel A, while the support C", the drive shaft and the driven shaft turn around the axis K–K' all at the same speed.

The device illustrated in FIGURE 5 is an embodiment of the arrangement of FIG. 4. Said device is in fact essentially constituted by an input shaft or drive shaft E and by output shaft or driven shaft D', both rotatable around the main axis K–K' of the system, by a drive wheel A of radius $r$ and by a driven planet wheel B of radius R larger than $r$, the axes of the wheels A and B respectively K–K' and G–G' being inclined to each other and intersecting at the central point Z. The axis of rotation G–G' of the wheel B is supported by the box-element C" rotating around the axis K–K' and the rotation of B is transmitted to the output shaft D' by means of a coupling assembly L–L'. Y is the fixed casing of the device and W is a hydraulic clutch mounted between the input shaft and the box-element C".

The wheel B receives the motive force F applied at the point of meshing between the wheels A and B, and produces with respect to the axis of rotation G–G' a moment greater than the driving moment, so that through the coupling assembly L–L', the system is capable of transmitting to the output shaft a maximum moment $\frac{1}{2}$ F.R. $\cos(90°\text{-alpha})$ in addition to the moment F.r when the wheel B remains stationary with respect to its axis of rotation G–G' and turns with respect to the axis K–K'. The combination of the two movements of rotation around the axes K–K' and G–G' causes an entire series of circular movements between a maximum and a minimum which are proportional to the diameter of the wheel $B=2R$ and the diameter of the wheel $A=2r$. The variation in the rotation movement is effected by progressive braking action from the hydraulic clutch W that acts between the input shaft E and the box-element C" supporting the wheel B (see FIGURE 5).

In FIGURES 6, 7, 8, there is illustrated a second embodiment of the invention. In this embodiment the arrangement of the members A, B, C", Y and the coaxial relation of the outlet shafts E and D' as well as the position of the point Z in which the two centers of rotation of the axes K–K' and G–G' coincide is retained. A centrifugal pump P composed by two symmetrical pump units is inserted in the system, said units being symmetrical with respect to the central radial plane of the wheel B with which it is rigid and together with which it turns around the axis G–G" on two supports N' and N" rigid with the box C" that is freely rotating around the main axis K–K' of the system.

One of the two pumps units forming the pump P is shown in front view in FIGURE 7 wherefrom it is seen that it is formed by a series of radial blading O adapted to convey a fluid, in particular oil, onto two sectors of blades T' and T", symmetrical with respect to the point Z, provided both inside the box C" and rigid therewith, which act as a turbine. The angle of entrance into the turbine corresponds to the angle formed by the plane H–H' of the wheel B with the main axis K–K' of the device. The reaction to the stress transmitted by the pump P rigid with the wheel B is absorbed by the center Z and by the engine. The element that reacts to the stress transmitted by the pump to the turbine will therefore be constituted by the two supports W'–W" which are rigid to the fixed external box Y in which the box-element C" freely turns on bearings and by the engine.

The fluid leaving the pump P enters the two sectors of blades T' and T" placed at the periphery of the box element C", namely distant from the center of reaction Z.

The thrust which the fluid will exert upon said sectors of blades will be in relationship with the delivery of the pump, with the angle existing between the plane H–H' and the axis K–K', with its speed of entrance into the turbine and with the distance of the blades of the turbine from the center Z.

The speed of entrance of the fluid into the turbine may be much higher than the absolute output speed of the pump if the passageway section of the conduits placed in the box-element C″ restricts gradually before the impact against the blades T′ and T″. The fluid leaving the turbine is conveyed again towards the orifices Po and Po′ of entrance into the pump units through two collectors with started flow $Co_1$—$Co_2$.

If the box-element C″ is to be stationary being blocked by a brake acting upon the output shaft D′, and the input shaft E is put to move, the movement of the oil contained in the box element C″ and actuated by the pump P dragged along in rotation by the drive wheel A, will produce a thrust upon the two sectors of blades T′ and T″ with the possibility of developing on the stationary box-element C″ a moment greater than the driving moment.

The fluid will circulate between the pump in rotation and the sectors of blades T′ and T″ rigid with the element C″ at standstill, thereby determining a double circuit in the shape of an "8" as clearly visible in particular in FIGURE 6.

All of the motive power will be delivered in this case in the form of hydraulic energy, since the fluid can freely flow through the 8-shaped circuit, and this energy will be dispersed in the form of heat.

If the brake on the shaft D′ is now released the box element C″ will start to rotate while transmitting the maximum moment at the minimum speed and as the speed is increasing, the fluid moving in the 8-shaped circuit will be subjected to the action of the centrifugal force generated not only by the rotation of the pump P, but by the rotation of the element C″ as well.

Then a resistance will be produced against the circulation of oil in the points farthest away from the axis K–K′, namely in the turbines, whence the pump will undergo a braking action transmitting in this case its hydraulic energy also in the form of pressure and not only of speed of flow of the oil.

At the maximum speed of rotation of the box-element C″ all of the energy of the pump—the oil being stationary with respect to the turbine—will be in the form of pressure and such pressure, if it corresponds to the driving moment, will stop the relative rotation between the wheels A and B if the resistant moment on the output shaft will be equal (or nearly so) to the driving moment as transmitted by the input shaft. The condition of "direct drive" can be stabilized in practice by a centrifugal friction device, not shown in the drawing, operating with masses that expand from housings placed in the box-element C″ and pressing against a drum fitted onto the drive shaft E.

The idling condition is determined by the low speeds of the drive shaft and, therefore, by the low values of the centrifugal forces developed in the system. Reverse drive can be obtained from the device merely with a second circuit in the turbines with fixed blades orientated in the opposite direction, or by making the blades movable and providing means for the orientation and control of the turbine blades.

Finally there may be provided a blading on the external surface of the movable box-element C″ and two series of holes $Ro_1$—$Ro_2$ at the headings of the fixed box, for the circulation of a cooling fluid.

What is claimed is:
1. A power transmitting device with variable speed, comprising a drive shaft driven in rotation about a determinable axis, a drive wheel on said drive shaft, an element mounted rotatably around the axis of said drive shaft, a driven wheel supported by said element and meshing with said drive wheel, said driven wheel having an axis of rotation inclined with respect to the axis of the drive shaft and a center on the axis of rotation of the drive shaft, a driven shaft coaxial with said drive shaft and connected to said driven wheel and coupling means connecting said element and said drive shaft and providing slippage therebetween depending on the torsional stress between said driven shaft and said drive shaft.

2. A device according to claim 1, comprising a coupling assembly connecting said driven wheel and said driven shaft.

3. A device according to claim 1 wherein said coupling means is a hydraulic clutch.

4. A power-transmitting device according to claim 1, comprising a hydraulic pump-and-turbine system drivingly connecting the driven wheel and the driven shaft, the pump of said system being coupled with said drive wheel and rotating on the same axis therewith, said pump being composed of two pump units symmetrical with respect to the central radial plane of said driven wheel, the turbine of said system being rigidly connected to said element rotatable around the axis of the drive shaft and enveloping the pump, said turbine being composed of two turbine units symmetrical with respect to the center of said driven wheel.

5. A device according to claim 4, wherein said pump is of the centrifugal type.

6. A device according to claim 5, wherein said pump-and-turbine system has conduits connecting the outlets of the pump and the inlets of the turbine which are symmetrical and opposed with respect to the center of the driven wheel.

7. A device according to claim 6, wherein said pump-and-turbine system further comprises two collectors which form with the pump-and-turbine a hydraulic circuit of "8"-shape.

8. A device according to claim 1 comprising a frame accommodating said rotatable element and wheels, said frame having inlet and outlet openings for the passage of a cooling fluid, said rotatable element including external blade means thereon for circulating the cooling fluid.

References Cited

UNITED STATES PATENTS

| | | | |
|---|---|---|---|
| 1,246,918 | 11/1917 | Hayes | 74—800 X |
| 1,360,216 | 11/1920 | Hunt | 74—751 |
| 1,674,355 | 9/1928 | Curran | 74—789 |
| 2,454,293 | 11/1948 | Waseige | 74—751 X |
| 2,844,051 | 7/1958 | Diaf-Caucajares | 74—751 |
| 3,171,299 | 3/1965 | Miner | 74—688 |

FOREIGN PATENTS 556,074   7/1923   France.

ROBERT M. WALKER, *Primary Examiner.*

DAVID J. WILLIAMOWSKY, *Examiner.*

J. R. BENEFIEL, *Assistant Examiner.*